(12) United States Patent
Beyer et al.

(10) Patent No.: US 7,080,547 B2
(45) Date of Patent: Jul. 25, 2006

(54) METHOD AND DEVICE FOR OPERATING AN INTERNAL COMBUSTION ENGINE

(75) Inventors: Hans-Ernst Beyer, Sachsenheim (DE); Frank Kastner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 10/840,179

(22) Filed: May 5, 2004

(65) Prior Publication Data
US 2005/0022795 A1  Feb. 3, 2005

(30) Foreign Application Priority Data
May 6, 2003  (DE)  ................................ 103 20 054

(51) Int. Cl.
*G01M 19/00*  (2006.01)

(52) U.S. Cl. .................................................... 73/118.1
(58) Field of Classification Search ........ 73/116–118.2
See application file for complete search history.

(56) References Cited

U.S. PATENT DOCUMENTS

| | | | | |
|---|---|---|---|---|
| 5,964,820 A * | 10/1999 | Miwa et al. | ................. | 701/108 |
| 6,029,451 A * | 2/2000 | Gartner | ...................... | 60/605.2 |
| 6,250,288 B1 * | 6/2001 | Fritz | ........................... | 123/520 |
| 6,276,343 B1 * | 8/2001 | Kawamura et al. | ......... | 123/520 |
| 6,588,257 B1 * | 7/2003 | Wild et al. | ................. | 73/117.3 |
| 6,631,634 B1 * | 10/2003 | Cook et al. | ................ | 73/118.1 |

* cited by examiner

*Primary Examiner*—Eric S. McCall
*Assistant Examiner*—Jermaine Jenkins
(74) *Attorney, Agent, or Firm*—Kenyon & Kenyon LLP

(57) ABSTRACT

A method and a device for operating an internal combustion engine having an intake manifold and a ventilation system may allow a reliable and fault-free diagnosis of a fault in the ventilation. The ventilation system may be a tank ventilation or a crankcase ventilation. The ventilation duct is conducted to the intake manifold of the internal combustion engine. At least one pressure differential may be determined between an intake-manifold pressure or an ambient pressure, on the one hand, and a pressure in the ventilation duct, on the other hand. A fault in the ventilation may be diagnosed as a function of the at least one pressure differential.

9 Claims, 4 Drawing Sheets

METHOD AND DEVICE FOR OPERATING AN INTERNAL COMBUSTION ENGINE

CROSS-REFERENCE TO RELATED APPLICATIONS

The present application claims priority to Application No. 103 20 054.1, filed in the Federal Republic of Germany on May 6, 2003, which is expressly incorporated herein in its entirety by reference thereto.

FIELD OF THE INVENTION

The present invention relates to a method and a device for operating an internal combustion engine.

BACKGROUND INFORMATION

Spark-ignition engines are provided with crankcase-ventilation systems. The "blow-by" gases, which are mixed with engine oil and flow from the combustion chamber past the piston of a cylinder into the crankcase, are first conducted to a liquid-vapor separator and then returned to the intake system of the engine for combustion, this return taking place at a suitable location where negative pressure is ideally present in nearly all operating states of the engine. To limit the negative pressure in the crankcase, a calibrated throttle valve is integrated in the ventilation duct. In turbo-engines, it is distinguished between partial load and full load ventilation. The full-load ventilation is initiated downstream from an air filter. The partial-load ventilation is conducted to the intake manifold. The result of a defect in the crankcase-ventilation system is, first of all, the escape of harmful HC emissions into the environment and, secondly, a changed operating point of the engine, especially during idling. When intake-manifold pressure sensors are used, such a defect will not lead to a mixture deviation since the measured intake-manifold pressure is always correct and it is basically unimportant from where the combustion air comes. If an air-mass flow sensor is used for detecting the load, a lasting mixture deviation would be produced and diagnosed.

SUMMARY

In contrast, the method and the device according to an example embodiment of the present invention for operating an internal combustion engine may provide the advantage over conventional methods and devices in that at least one pressure differential is ascertained between an intake-manifold pressure, or an ambient pressure, on the one hand, and a pressure in the ventilation duct, on the other hand, and that a fault in the ventilation is diagnosed as a function of the at least one pressure differential. In this manner, faults in the ventilation may also be diagnosed in internal combustion engines in which the load is detected by an intake-manifold pressure sensor. As a result, leakages or disconnected hoses of the ventilation or ventilation duct may be detected in a reliable manner. In internal combustion engines in which the load is detected by an air-mass flow sensor, a fault in the ventilation may be located unequivocally, and leakages or disconnected hoses of the ventilation or the ventilation duct, for example, may be detected in a reliable manner.

According to an example embodiment of the present invention, a first pressure differential may be generated between the intake-manifold pressure and the pressure in the ventilation duct and a fault in the ventilation may be diagnosed if the first pressure differential exceeds a first preselected value. In this manner, it may be possible to realize the diagnosis of a fault in the ventilation in a very simple manner, utilizing only one additional pressure sensor in the ventilation duct.

According to an example embodiment of the present invention, a second pressure differential may be generated between the ambient pressure and the pressure in the ventilation duct and a fault in the ventilation may be diagnosed when the second pressure differential falls below a second preselected value.

According to an example embodiment of the present invention, a first pressure differential may be generated from the pressure in the ventilation duct and the intake-manifold pressure; the second pressure differential may be generated from the ambient pressure and the pressure in the ventilation duct, and a fault in the ventilation may be diagnosed if the first pressure differential is greater than the second pressure differential.

The risk of a false diagnosis may be reduced if at least two of the previously mentioned diagnostic steps are combined for diagnosing a fault in the ventilation, so that a fault in the ventilation is diagnosed only if all of the checked diagnostic steps indicate a fault in the ventilation.

According to an example embodiment of the present invention, a fault may be diagnosed only if, additionally, a difference from a maximum and a minimum intake-manifold pressure is greater than a third preselected value. In this manner as well, the risk of a faulty diagnosis of a fault in the ventilation due to one or several of the afore-mentioned diagnostic steps may be reduced further.

According to an example embodiment of the present invention, at least one pressure differential and/or the intake-manifold pressure may be low-pass filtered. In this manner, measured pressure spikes may be smoothed and the diagnosis of a fault in the ventilation may be less prone to faults.

According to an example embodiment of the present invention, a maximum value may be generated from the at least one pressure differential and/or the intake-manifold pressure for the diagnosis. This may ensure a largely fault-free diagnosis.

According to an example embodiment of the present invention, a minimum value may be formed from the intake-manifold pressure for the diagnosis.

According to an example embodiment of the present invention, a method for operating an internal combustion engine having an intake manifold and a ventilation duct of ventilation system includes: determining at least one pressure differential between one of (i) an intake-manifold pressure and a pressure in the ventilation duct and (ii) an ambient pressure and the pressure in the ventilation duct; and determining a fault in the ventilation system as a function of the at least one pressure differential.

The ventilation system may include one of (i) a tank ventilation system and (ii) a crankcase ventilation system conducted to the intake manifold of the internal combustion engine The method may include generating a first pressure differential between the intake-manifold pressure and the pressure in the ventilation duct, and the determining step may include determining a fault in the ventilation system if the first pressure differential exceeds a first preselected value.

The method may include generating a second pressure differential between the ambient pressure and the pressure in the ventilation duct, and the determining step may include determining a fault in the ventilation system if the second pressure differential falls below a second preselected value.

The method may include generating a first pressure differential between the pressure in the ventilation duct and the intake-manifold pressure and generating a second pressure differential between the ambient pressure and the pressure in the ventilation duct; and the determining step may include determining a fault in the ventilation system if the first pressure differential is greater than the second pressure differential.

The determining step may include determining a fault only if, in addition, a difference between a maximum intake-manifold pressure and a minimum intake-manifold pressure is greater than a third preselected value.

The method may include low-pass filtering at least one of (i) the at least one pressure differential and (ii) the intake-manifold pressure.

The method may include generating a maximum value from at least one of (i) the at least one pressure differential and (ii) the intake-manifold pressure.

The method may include generating a minimum value from the intake-manifold pressure.

According to an example embodiment of the present invention, a device for operating an internal combustion engine having an intake manifold and a ventilation duct of a ventilation system includes: a detector configured to ascertain at least one pressure differential between one of (i) an intake-manifold pressure and a pressure in the ventilation duct and (ii) an ambient pressure and the pressure in the ventilation duct; and a diagnostic unit configured to diagnose a fault in the ventilation system as a function of the at least one pressure differential. The ventilation system may include one of (i) a tank ventilation system and (ii) a crankcase ventilation system that is conducted to the intake manifold of the internal combustion engine.

According to an example embodiment of the present invention, a device for operating an internal combustion engine having an intake manifold and a ventilation duct of a ventilation system includes: means for ascertaining at least one pressure differential between one of (i) an intake-manifold pressure and a pressure in the ventilation duct and (ii) an ambient pressure and the pressure in the ventilation duct; and means for diagnosing a fault in the ventilation system as a function of the at least one pressure differential. The ventilation system may include one of (i) a tank ventilation system and (ii) a crankcase ventilation system that is conducted to the intake manifold of the internal combustion engine.

Exemplary embodiments of the present invention are illustrated in the appended Figures and explained in the following description.

DETAILED DESCRIPTION

Figure 1:
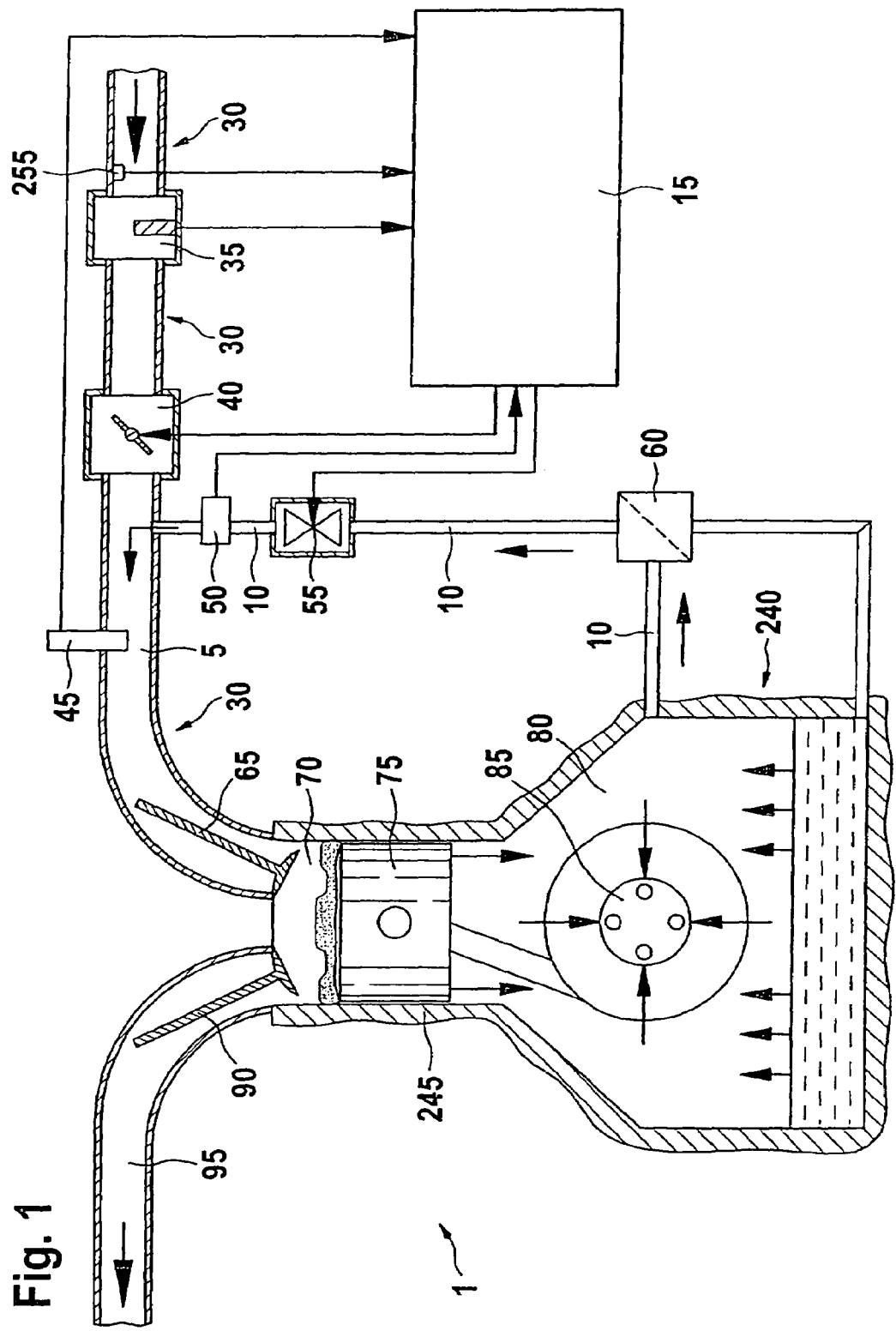
FIG. 1 is a schematic view of an internal combustion engine.

In FIG. 1, reference numeral 1 designates an internal combustion engine as a whole, the combustion engine belonging to a motor vehicle, for example. Internal combustion engine 1 includes a combustion engine 240, which may be embodied as a spark-ignition engine or as a diesel engine, for instance. In the following, for example, internal combustion engine 240 may be a spark-ignition engine. FIG. 1 shows one of possibly several cylinders of spark-ignition engine 240. The cylinder is indicated by reference numeral 245 in FIG. 1. Via an intake valve 65, an intake manifold 5 conducts air to a combustion chamber 70 of cylinder 245. Intake manifold 5 is part of an air supply 30 and represents the part of air supply 30 between a throttle valve 40 and an intake valve 65. Arranged in intake manifold 5 is an intake-manifold pressure sensor 45. Intake-manifold pressure sensor 45 measures the intake-manifold pressure pi in intake manifold 5 and conveys the measuring result to an engine control 15. Engine control 15 represents a device according to an example embodiment of the present invention, which will be described in greater detail in the following. Via a ventilation duct 10, gases, for example, so-called blow-by gases, which flow from combustion chamber 70 into a crankcase 80 of cylinder 245 past a piston 75 of cylinder 245, are conveyed from crankcase 80 to intake manifold 5. The gases emerging from crankcase 80 are first conducted to an oil separator 60, where they are separated from engine-oil components. The gases purified in this manner reach intake manifold 5 via a crankcase-ventilation valve 55 and a crankcase-ventilation pressure sensor 50 arranged between crankcase ventilation valve 55 and the point where ventilation duct 10 joins intake manifold 5. This is also referred to as partial-load ventilation. Crankcase-ventilation pressure sensor 50 measures pressure pcc in ventilation duct 10, between crankcase-ventilation valve 55 and intake manifold 5, and transmits the measuring result to engine control 15. In FIG. 1, the direction of flow of the gas in ventilation duct 10 and of the fresh air supplied via air supply 30 is indicated by arrows. Arranged in air supply 30 in the direction of flow of the fresh air, upstream from throttle valve 40, is an air-mass flow sensor 35, such as a hot-film air-mass meter, which measures the fresh-air mass flow conducted to intake manifold 5, conveying the measuring result to engine control 15. An ambient-pressure sensor 255 is arranged in air supply 30, preceding air-mass flow sensor 35 in the flow direction of the fresh air, the sensor measuring the ambient pressure pa present at this location in air supply 30 and transmitting the measuring result to engine control 15. Crankcase-ventilation valve 55 limits the negative pressure in crankcase 80 and is triggered or calibrated accordingly by engine control 15. To adjust a fresh-air mass flow that is required, for instance, to convert a driver-selected torque, engine control 15 also triggers throttle valve 40 so as to set a suitable opening degree in, e.g., a conventional manner. The injection of fuel may be implemented via intake manifold 5 or directly into combustion chamber 70 in a conventional manner. The air/fuel mixture present in combustion chamber 70 is ignited by a spark plug. As a result of the combustion of the air/fuel mixture, piston 75 is set in motion, which in turn drives a crankshaft 85. The exhaust gas produced in the combustion of the air/fuel mixture is discharged into an exhaust branch 95 via a discharge valve 90, the direction of flow of the exhaust gas being indicated by an arrow in FIG. 1.

Figure 2:
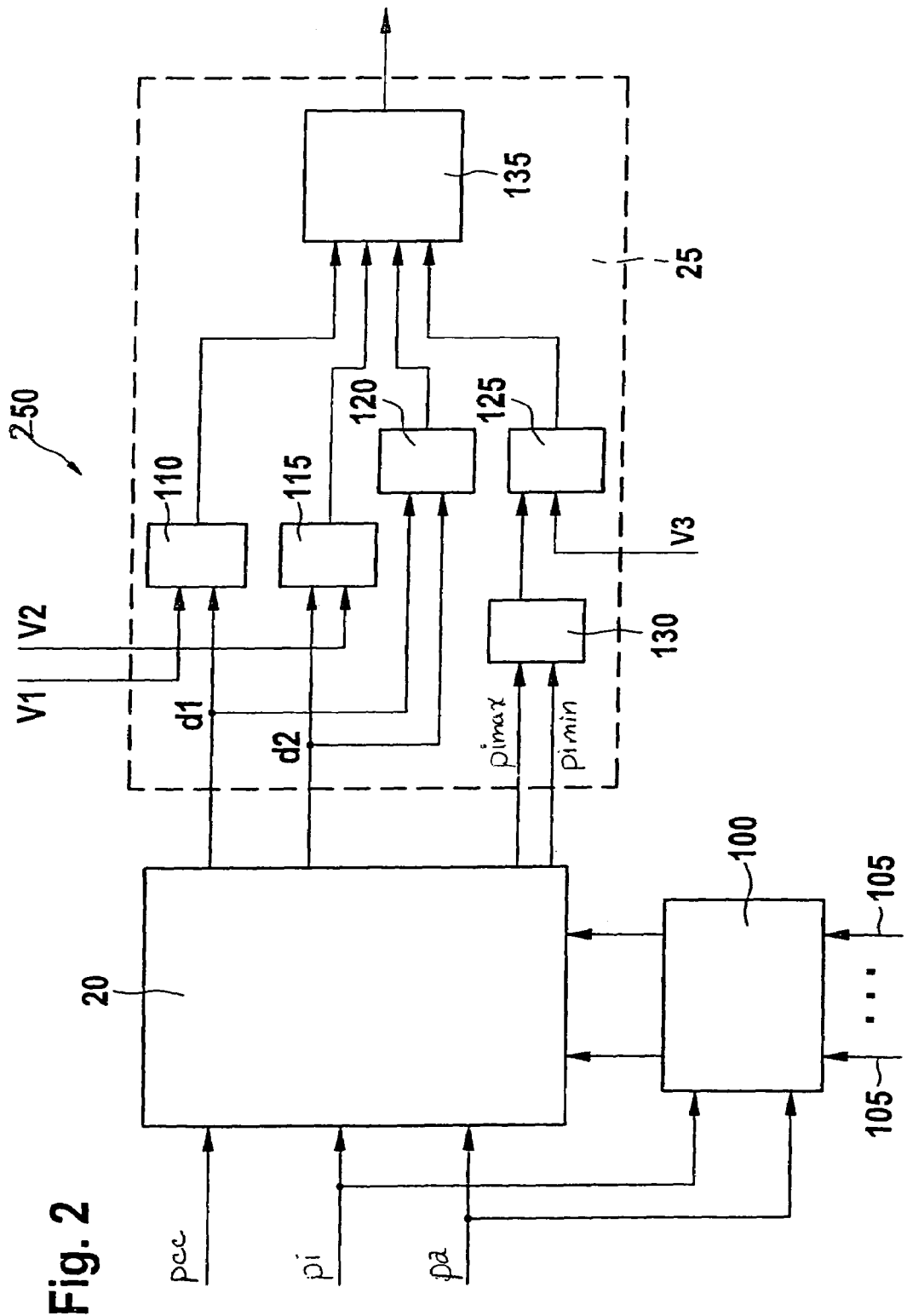
FIG. 2 shows a flow chart of a diagnostic device of the internal combustion engine.

FIG. 2 shows a flow chart, which may be implemented in engine control 15 in the form of hardware or software. The flow chart in FIG. 2 shows a diagnostic device 250. Diagnostic device 250 includes a detection unit 20. Crankcase-ventilation pressure sensor 50 supplies detection unit 20 with pressure pcc in ventilation duct 10. Detection unit 20 is also supplied with intake-manifold pressure pi via intake-manifold pressure sensor 45. In addition, ambient-pressure sensor 255 supplies detection unit 20 with ambient pressure pa. Ambient pressure pa may also be modeled in engine control 15 in a conventional manner. Furthermore, a diagnosis-enabling unit 100 transmits a first enabling signal e1 and a second enabling signal e2 to detection unit 20. Diagnosis-enabling unit 100 is provided with intake-manifold pressure pi and ambient pressure pa. In addition, input signals 105 are supplied to diagnosis-enabling unit 100. These are explained in greater detail in the following. As a function of the supplied variables, detection unit 20 generates a first differential signal d1, a second differential signal d2, a maximum intake-manifold pressure pimax and a minimum intake-manifold pressure pimin. The generated variables are supplied to a diagnostic unit 25 of diagnostic device 250. In doing so, first differential signal d1 is conveyed to a first comparison member 110 to which a first preselected value V1 is supplied as well. If first differential signal d1 is greater than first preselected value V1, an output of first comparison member 110 is set. Otherwise, the output of first comparison member 110 is set back. The output of first comparison member 110 is conducted to a first AND gate 135. A fault-detection signal is present at the output of first AND gate 135. Furthermore, second differential signal d2 is supplied to a second comparison member 115 to which a second preselected value V2 is conveyed in addition. If second differential signal d2 is greater than second preselected value V2, an output of second comparison member 115 is set. Otherwise, the output of second comparison member 115 is set back. The output of second comparison member 115 is also conducted to first AND gate 135. First differential signal d1 and second differential signal d2 are also supplied to a third comparison member 120. If first differential signal d1 is greater than second differential signal d2, the output of third comparison member 120 is set. Otherwise, the output of third comparison member 120 is set back. The output of third comparison member 120 is conducted to first AND gate 135 as well. Maximum intake-manifold pressure pimax and minimum intake-manifold pressure pimin are supplied to a first subtraction element 130. In first subtraction element 130, minimum intake-manifold pressure pimin is subtracted from maximum intake-manifold pressure pimax, the difference being supplied to a fourth comparison member 125. Also supplied to fourth comparison member 125 is a third preselected value V3. An output of fourth comparison member 125 is set when the conveyed difference is greater than third preselected value V3. Otherwise, the output of fourth comparison member 125 is set back. The output of fourth comparison member 125 is conducted to first AND gate 135 as well. The output of first AND gate 135, and thus the fault-detection signal, is set, thereby indicating a diagnosed fault of the ventilation by ventilation duct 10, in the form of a leakage or a disconnected hose, for example, in those cases where all input signals of first AND gate 135 are set. Otherwise, the fault-detection signal is set back, and no fault in the ventilation is diagnosed.

Figure 3:
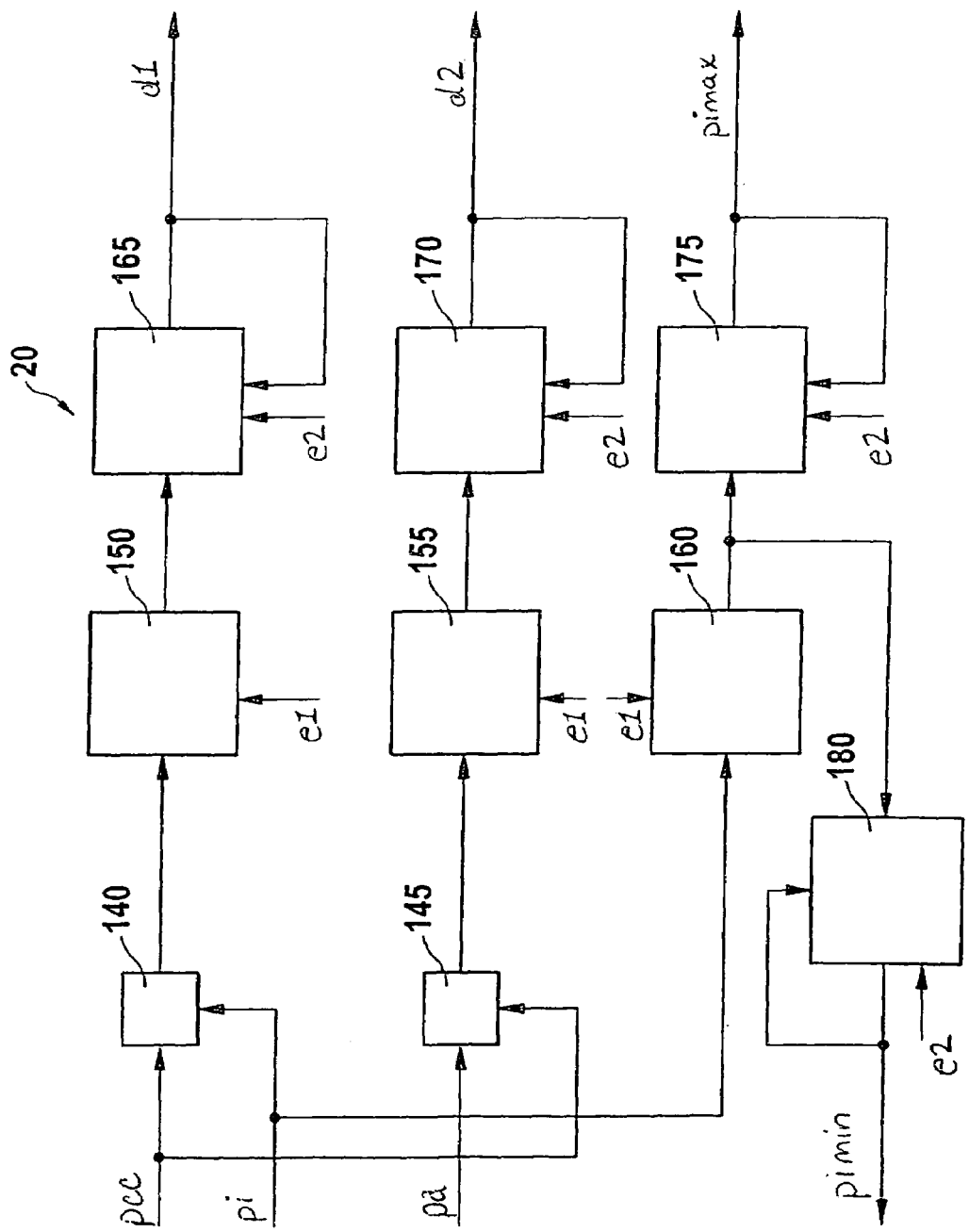
FIG. 3 shows a flow chart of a detection unit of the diagnostic device.

FIG. 3 shows a flow chart for realizing detection unit 20. Intake-manifold pressure pi is conveyed to a second subtraction element 140, where it is subtracted from pressure pcc in ventilation duct 10. The difference is supplied to a first low pass 150. In first low pass 150, the conveyed difference is low-pass filtered using an applicable first time constant. The low-pass filtered difference is supplied to a first maximum element 165. First maximum element 165 stores a low-pass filtered differential value received for the first time, as a maximum value, and transmits it at its output as first differential signal d1. This maximum value is coupled back to first maximum element 165 and compared there to subsequently received, low-pass filtered differential values. If a subsequently received low-pass filtered differential value is greater than the maximum value currently stored and supplied at the output of first maximum element 165, this maximum value is equated to the subsequently received low-pass filtered differential value and transmitted as new first differential signal d1. Furthermore, pressure pcc in ventilation duct 10 is transmitted to a third subtraction element 145 and subtracted there from ambient pressure pa. The difference is supplied to a second low pass 155. In second low pass 155, the conveyed difference is low-pass filtered using an applicable second time constant. The low-pass filtered difference is supplied to a second maximum element 170. Second maximum element 170 stores a low-pass filtered differential value received for the first time, as a maximum value, and transmits it at its output as second differential signal d2. This maximum value is coupled back to second maximum element 170 and compared there to subsequently received, low-pass filtered differential values. If a subsequently received, low-pass filtered differential value is greater than the currently stored maximum value transmitted at the output of second maximum element 170, this maximum value is equated to the subsequently received, low-pass filtered differential value and transmitted as new second differential signal d2. Intake-manifold pressure pi is supplied to a third low pass 160 and low-pass filtered there using an applicable third time constant. Low-pass filtered intake-manifold pressure pi is transmitted to a third maximum element 175. Third maximum element 175 stores a low-pass filtered intake-manifold pressure value received for the first time, as a maximum value, and transmits it at its output as a maximum intake-manifold pressure pimax. This maximum value is coupled back to third maximum element 175 and compared there to subsequently received, low-pass filtered intake-manifold pressure values. If a subsequently received, low-pass filtered intake-manifold pressure value is greater than the currently stored maximum value transmitted at the output of third maximum element 175, this maximum value is equated to the subsequently received, low-pass filtered intake-manifold pressure value and transmitted as new maximum intake-manifold pressure pimax. Low-pass filtered intake-manifold pressure pi is also conveyed to a minimum element 180. Minimum element 180 stores a low-pass filtered intake-manifold pressure value received for the first time, as minimum value, and transmits it at its output as minimum intake-manifold pressure pimin. This minimum value is coupled back to minimum element 180 and compared there to subsequently received, low-pass filtered intake-manifold pressure values. If a subsequently received, low-pass filtered intake-manifold pressure value is smaller than the currently stored minimum value supplied at the output of minimum element 180, this minimum value is equated to the subsequently received, low-pass filtered intake-manifold pressure value and transmitted as new minimum intake-manifold pressure pimin. Also conducted to the three low passes 150, 155, 160 in each case is first enabling signal e1. If first enabling signal e1 is set, the low-pass filtering is enabled for the three low passes 150, 155, 160; otherwise, the low-pass filtering is blocked. Second enabling signal e2 is supplied to each of the three maximum elements 165, 170, 175 and to minimum element 180. If second enabling signal e2 is set, the maximum generation is enabled in the three maximum elements 165, 170, 175 and the minimum generation is enabled in minimum element 180; otherwise, the maximum generation and the minimum generation are blocked.

Figure 4:
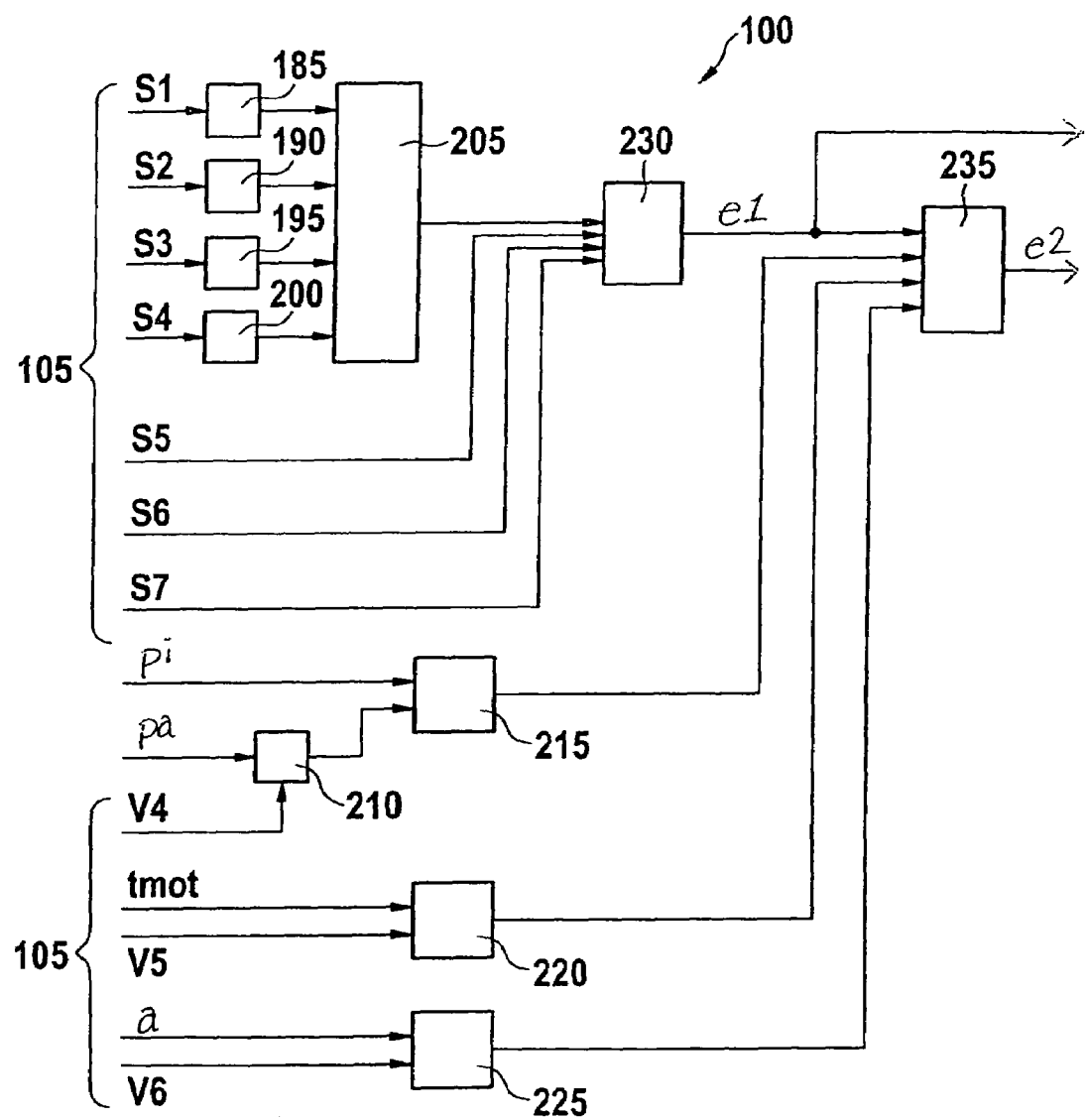
FIG. 4 shows a flow chart for a diagnosis-enabling unit of the diagnostic device.

FIG. 4 shows a flow chart for realizing diagnosis-enabling unit 100. A first inversion element 185 is supplied with a first fault signal S1, which is set if a fault of intake-manifold pressure sensor 45 was diagnosed and which is set back otherwise. First inversion element 185 inverts first fault signal S1. If first fault signal S1 is set, the output of first inversion element 185 is set back. If first fault signal S1 is set back, the output of first inversion element 185 is set. The output of first inversion element 185 is conveyed to a second AND gate 205. A second fault signal S2 is transmitted to a second inversion element 90, second fault signal S2 being set if a fault of ambient-pressure sensor 255 was diagnosed and being set back if this is not the case. Second inversion element 190 inverts second fault signal S2. If second fault signal S2 is set, the output of second inversion element 190 is set back. If second fault signal S2 is set back, the output of second inversion element 190 is set. The output of second inversion element 190 is transmitted to second AND gate 205. A third inversion element 195 is supplied with a third fault signal S3, which is set if a fault of crankcase-ventilation pressure sensor 50 was diagnosed and which is set back otherwise. Third inversion element 195 inverts third fault signal S3. If third fault signal S3 is set, the output of third inversion element 195 is set back. If third fault signal S3 is set back, the output of third inversion element 195 is set. The output of third inversion element 195 is supplied to second AND gate 205. A fourth inversion element 200 is supplied with a fourth fault signal S4, which is set if a fault of an engine-temperature sensor was diagnosed and which is set back otherwise. Fourth inversion element 200 inverts fourth fault signal S4. If fourth fault signal S4 is set, the output of fourth inversion element 200 is set back. If fourth fault signal S4 is set back, the output of fourth inversion element 200 is set. The output of fourth inversion element 200 is supplied to second AND gate 205. When all inputs of second AND gate 205 are set, the output of second AND gate 205 is set as well. If only one of the input variables of second AND gate 205 is set back, the output of second AND gate 205 is set back as well. The output of second AND gate 205 is conveyed to a third AND gate 230. Third AND gate 230 is also supplied with a fifth fault signal S5, which is set if a diagnosis of intake-manifold pressure sensor 45 has elapsed or has ended and which is set back otherwise. Third AND gate 230 is also supplied with a sixth fault signal S6, which is set if a diagnosis of ambient-pressure sensor 255 has elapsed or has ended and which is set back otherwise. Third AND gate 230 is supplied with a seventh fault signal S7 as well, which is set if a start of spark-ignition engine 240 has ended and which is set back otherwise. First enabling signal e1 is the output of third AND gate 230 and is set when all input signals of third AND gate 230 are set and which is set back otherwise. First enabling signal e1 is supplied to a fourth AND gate 235. In a fourth subtraction element 210, a fourth preselected value V4 is subtracted from ambient pressure pa. The difference is supplied to a fifth comparison member 215, where it is compared to intake-manifold pressure pi. If intake-manifold pressure pi is smaller than the difference generated in fourth subtraction element 210, an output of fifth comparison element 215 is set; otherwise, this output is set back. The output of fifth comparison element 215 is supplied to fourth AND gate 235. In a sixth comparison element 220, engine-temperature value tmot, measured by the engine-temperature sensor and supplied to engine control 15, is compared to a fifth, preselected value V5. If measured engine-temperature value tmot is greater than fifth preselected value V5, an output of sixth comparison element 220 is set; otherwise, this output is set back. The output of sixth comparison member 220 is also conducted to fourth AND gate 235. In a seventh comparison member 225, an altitude value a of the altitude of the vehicle above sea level, which was modeled from the measured ambient pressure pa and measured engine temperature tmot, for example, is compared to a sixth preselected value V6. If measured altitude value a is greater than sixth preselected value V6, an output of seventh comparison element 225 is set; otherwise, this output is set back. The output of seventh comparison member 225 is also conducted to fourth AND gate 235. Second enabling signal e2 is the output of fourth AND gate 235 and is set if all input signals of fourth AND gate 235 are set and is set back otherwise. Fault signals S1 through S7, preselected values V4 through V6, engine-temperature value tmot and altitude value a form input signals 105 of diagnosis-enabling unit 100.

First differential signal d1 constitutes a maximum, low-pass filtered pressure differential between pressure pcc in ventilation duct 10 and intake-manifold pressure pi. Second differential signal d2 constitutes a maximum, low-pass filtered pressure differential between ambient pressure pa and pressure pcc in ventilation duct 10. The low-pass generation, using low passes 150, 155, 160, allows a smoothing of pressure spikes, which makes the fault diagnosis more reliable. However, the low-pass filtering using low passes 150, 155, 160 may not be absolutely required. The maximum generation on the basis of the three maximum elements 165, 170, 175 and minimum element 180 also may allow a reliable detection and diagnosis of a fault in the ventilation since the diagnosis utilizes the occurring extreme values of the pressure differentials and the intake-manifold pressure. But even the maximum generation using maximum elements 165, 170, 175 and the minimum generation using minimum element 180 may not be absolutely required. The low-pass filtering and the maximum generation as well need not be applied to each utilized pressure differential or intake-manifold pressure pi. Furthermore, the fault diagnosis in the ventilation—in this case, the crankcase ventilation—may also be implemented in a corresponding manner solely on the basis of first differential signal d1, i.e., the pressure differential between pressure pcc in ventilation duct 10 and intake-manifold pressure pi, in comparison to first, preselected value V1 (first diagnostic step), or solely on the basis of second differential signal d2, i.e., the pressure differential between ambient pressure pa and pressure pcc in ventilation duct 10, in comparison to second, preselected value V2 (second diagnostic step), or solely on the basis of the comparison between the two differential signals d1, d2, i.e., the pressure differentials (third diagnostic step). The individual diagnostic steps may also be utilized in any combination to detect a fault. In addition, the diagnosis of the fault may be made dependent on a comparison, in the manner described (fourth diagnostic step), of the difference from the possibly low-pass filtered and/or maximally determined intake-manifold pressure and the possibly low-pass filtered and/or minimally determined intake-manifold pressure, with third preselected value V3. According to the exemplary embodiment of FIG. 2, all four diagnostic steps are implemented for diagnosing a fault in the ventilation, that is to say, a fault is diagnosed only if all checked diagnostic steps result in a set signal at the input of first AND gate 135. Preselected values V1 through V6 may be applied in a suitable manner, on a test stand, for example, such that a fault in the crankcase ventilation with respect to the three preselected values V1 to V3 may be detected in a reliable manner, on one hand, and measuring tolerances of the utilized pressure sensors, 45, 50, 255, may be taken into account, on the other hand. Preselected values V4 through V6 may also be suitably applied on a test stand, for example, such that the implementation of the diagnostic steps and their evaluation by enabling signals e1, e2 will be allowed under defined operating and ambient conditions only, thereby avoiding faulty influences by the operating and ambient conditions. Using fault signals S5 through S7, the fault diagnosis may be implemented if utilized pressure sensors 45, 50, 255 and the utilized engine-temperature sensor have been diagnosed to be free of faults, if this diagnosis was concluded at least for intake-manifold pressure sensor 45 and ambient-pressure sensor 255, and if the engine start of spark-ignition engine 240 had been concluded. In this manner, faulty influences of the utilized sensors and their diagnosis as well as faulty influences on the fault diagnosis of the crankcase ventilation caused by the engine start may be avoided.

A corresponding diagnostic procedure may be realized for a tank ventilation having a tank-ventilation valve and a pressure sensor arranged between the tank-ventilation valve and the point where the tank ventilation enters intake manifold 5.

A diagnosed fault in the ventilation may be stored in engine control 15 and displayed to a driver of the motor vehicle, for example, in an instrument cluster. The fault stored in engine control 15 may be read out by a tester in a service facility, for instance.

In the case of-fault-free ventilation, measured pressure pcc in ventilation duct 10 is proportional to measured intake-manifold pressure pi and is determined by the throttle effect of crankcase-ventilation valve 55, which may be designed as check valve, or by the cross-sectional area of ventilation duct 10. The principle of the afore-described diagnosis of a fault in the ventilation is based on the fact that the pressure differential between pressure pcc in ventilation duct 10 and intake-manifold pressure pi is low in fault-free ventilation and is independent of the load of spark-ignition engine 240, which may be characterized here by intake-manifold pressure pi. This generally applies for intake-manifold pressures pi that are less than, or equal to, ambient pressure pa, especially in the case of supercharged spark-ignition engines or supercharged diesel engines which are not considered further here, since crankcase-ventilation valve 55, and thus the crankcase ventilation, may be blocked otherwise. In addition, in fault-free ventilation, the pressure differential between ambient pressure pa and pressure pcc in ventilation duct 10 may be heavily dependent on the load. If a fault has occurred, for example in the case of a leak in ventilation duct 10, these conditions are reversed, i.e., the pressure differential between pressure pcc in ventilation duct 10 and intake-manifold pressure pi becomes greater and is a function of the load, whereas the pressure differential between ambient pressure pa and pressure pcc in ventilation duct 10 may approach zero, depending on the location of the leak in ventilation duct 10, and is independent of the load. Furthermore, in the case of a fault, first differential signal d1, i.e., the pressure differential between pressure pcc in ventilation duct 10 and intake-manifold pressure pi, becomes greater than second differential signal d2, i.e., the pressure differential between ambient pressure pa and pressure pcc in ventilation duct 10. On the other hand, if no fault is present, second differential signal d2 is correspondingly greater than first differential signal d1. Furthermore, an existing fault is distinguished from the case of no fault by the additional fact that the difference between maximum intake-manifold pressure pimax and minimum intake-manifold pressure pimin exceeds third preselected value V3, that is to say, considerable fluctuations in the intake-manifold pressure occur during the diagnosis.

Using the method according to an example embodiment of the present invention and the device according to an example embodiment of the present invention, a defect of the crankcase-ventilation system and/or a tank-ventilation system may be detected even when an intake-manifold pressure sensor 45 is utilized for determining the engine load and no air-mass flow sensor 35 is provided, and may be diagnosed as leakage or hose disconnection of ventilation duct 10 in a reliable and timely manner. As a result, it is possible to comply with legislative requirements governing the escape of harmful exhaust gases, for example, of HC emissions, and faulty states of the ventilation may be diagnosed early enough before lasting deviations of the actual engine speed from the setpoint engine speed occur during an idling operating state. Due to the diagnosis, the fault state may be indicated to the driver, allowing the driver to visit a service facility. The diagnosis according to the method of an example embodiment of the present invention and utilization of the device according to an example embodiment of the present invention may also be carried out in the case of systems in which the engine load is implemented solely by an air-mass flow sensor 35 and in which no intake-manifold pressure sensor 45 is provided. In this case, too, a clear fault detection and localization may be possible.

What is claimed is:

1. A method for operating an internal combustion engine having an intake manifold and a ventilation duct of ventilation system, comprising:
    determining at least one pressure differential between one of (i) an intake-manifold pressure and a pressure in the ventilation duct and (ii) an ambient pressure and the pressure in the ventilation duct; and
    determining a fault in the ventilation system as a function of the at least one pressure differential;
    wherein the ventilation system includes one of (i) a tank ventilation system and (ii) a crankcase ventilation system conducted to the intake manifold of the internal combustion engine.

2. The method according to claim 1, further comprising generating a first pressure differential between the intake-manifold pressure and the pressure in the ventilation duct, wherein the determining step includes determining a fault in the ventilation system if the first pressure differential exceeds a first preselected value.

3. The method according to claim 1, further comprising generating a maximum value from at least one of (i) the at least one pressure differential and (ii) the intake-manifold pressure.

4. The method according to claim 1, further comprising generating a minimum value from the intake-manifold pressure.

5. A method for operating an internal combustion engine having an intake manifold and a ventilation duct of ventilation system, comprising:
    determining at least one pressure differential between one of (i) an intake-manifold pressure and a pressure in the ventilation duct and (ii) an ambient pressure and the pressure in the ventilation duct;
    determining a fault in the ventilation system as a function of the at least one pressure differential; and
    generating a second pressure differential between the ambient pressure and the pressure in the ventilation duct, wherein the determining step includes determining a fault in the ventilation system if the second pressure differential falls below a second preselected value.

6. A method for operating an internal combustion engine having an intake manifold and a ventilation duct of ventilation system, comprising:
   determining at least one pressure differential between one of (i) an intake-manifold pressure and a pressure in the ventilation duct and (ii) an ambient pressure and the pressure in the ventilation duct;
   determining a fault in the ventilation system as a function of the at least one pressure differential;
   generating a first pressure differential between the pressure in the ventilation duct and the intake-manifold pressure; and
   generating a second pressure differential between the ambient pressure and the pressure in the ventilation duct;
   wherein the determining step includes determining a fault in the ventilation system if the first pressure differential is greater than the second pressure differential.

7. A method for operating an internal combustion engine having an intake manifold and a ventilation duct of ventilation system, comprising:
   determining at least one pressure differential between one of (F) an intake-manifold pressure and a pressure in the ventilation duct and (ii) an ambient pressure and the pressure in the ventilation duct; and
   determining a fault in the ventilation system as a function of the at least one pressure differential;
   wherein the determining step includes determining a fault only if, in addition, a difference between a maximum intake-manifold pressure and a minimum intake-manifold pressure is greater than a third preselected value.

8. A method for operating an internal combustion engine having an intake manifold and a ventilation duct of ventilation system, comprising:
   determining at least one pressure differential between one of (F) an intake-manifold pressure and a pressure in the ventilation duct and (ii) an ambient pressure and the pressure in the ventilation duct;
   determining a fault in the ventilation system as a function of the at least one pressure differential; and
   low-pass filtering at least one of (i) the at least one pressure differential and (ii) the intake-manifold pressure.

9. A device for operating an internal combustion engine having an intake manifold and a ventilation duct of a ventilation system, comprising:
   a detector configured to ascertain at least one pressure differential between one of (i) an intake-manifold pressure and a pressure in the ventilation duct and (ii) an ambient pressure and the pressure in the ventilation duct;
   a diagnostic unit configured to diagnose a fault in the ventilation system as a function of the at least one pressure differential;
   wherein the ventilation system includes one of (i) a tank ventilation system and (ii) a crankcase ventilation system that is conducted to the intake manifold of the internal combustion engine.

* * * * *